United States Patent
Lewis (10) Patent No.: US 6,937,251 B2
(45) Date of Patent: Aug. 30, 2005

(54) METHOD AND SYSTEM FOR IMPROVING COLOR QUALITY OF THREE-DIMENSIONAL RENDERED IMAGES

(75) Inventor: Michael C. Lewis, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 10/259,354

(22) Filed: Sep. 27, 2002

(65) Prior Publication Data

US 2003/0025707 A1 Feb. 6, 2003

Related U.S. Application Data

(63) Continuation of application No. 09/590,757, filed on Jun. 8, 2000, now Pat. No. 6,486,887.

(51) Int. Cl.[7] .............................................. G06T 11/40
(52) U.S. Cl. ..................... 345/587; 345/582; 345/589
(58) Field of Search ................................ 345/582, 586, 345/587, 589, 428, 581

(56) References Cited

U.S. PATENT DOCUMENTS

6,005,583 A   12/1999   Morrison
6,356,273 B1   3/2002   Posniewski et al.

Primary Examiner—Matthew Luu
(74) Attorney, Agent, or Firm—Sawyer Law Group LLP (57) ABSTRACT

A method and system for providing a graphical image on a display is disclosed. The image is provided from data describing at least one object. The display includes a plurality of pixels. Each of the plurality of pixels has a size and a plurality of display elements. Each of the plurality of display elements has a color. The data includes a plurality of fragments for the at least one object. The plurality of fragments intersects a portion of the plurality of pixels. Each of the plurality of fragments includes a texture and at least one color. The method and system include ensuring that a texture area corresponds to the size of the pixel for the plurality of fragments and taking a plurality of samples of the at least one color for each of the plurality of fragments. The plurality of samples corresponds to the plurality of display elements. The method and system also include processing the texture for each of the plurality of fragments using the texture area. The method and system also include processing the at least one color for a each of the plurality of fragments utilizing one sample of the plurality of samples for each of the plurality of display elements for each of the portion of the plurality of pixels.

8 Claims, 7 Drawing Sheets

Prior Art

Figure 1

Prior Art

Figure 2A

Prior Art

Figure 2B

Prior Art

Figure 2C

Prior Art

METHOD AND SYSTEM FOR IMPROVING COLOR QUALITY OF THREE-DIMENSIONAL RENDERED IMAGES

Continuation of prior application Ser. No: 09/590,757 filed on: Jun. 8, 2000, now U.S. Pat. No. 6,486,887.

FIELD OF THE INVENTION

The present invention relates to computer systems, particularly computer graphics systems, and more particularly to a method and system for improving the color quality of a 3D rendered image for a computer system using a display which contains discrete color elements, such as a liquid crystal display (LCD) or plasma display.

BACKGROUND OF THE INVENTION

Figure 1:
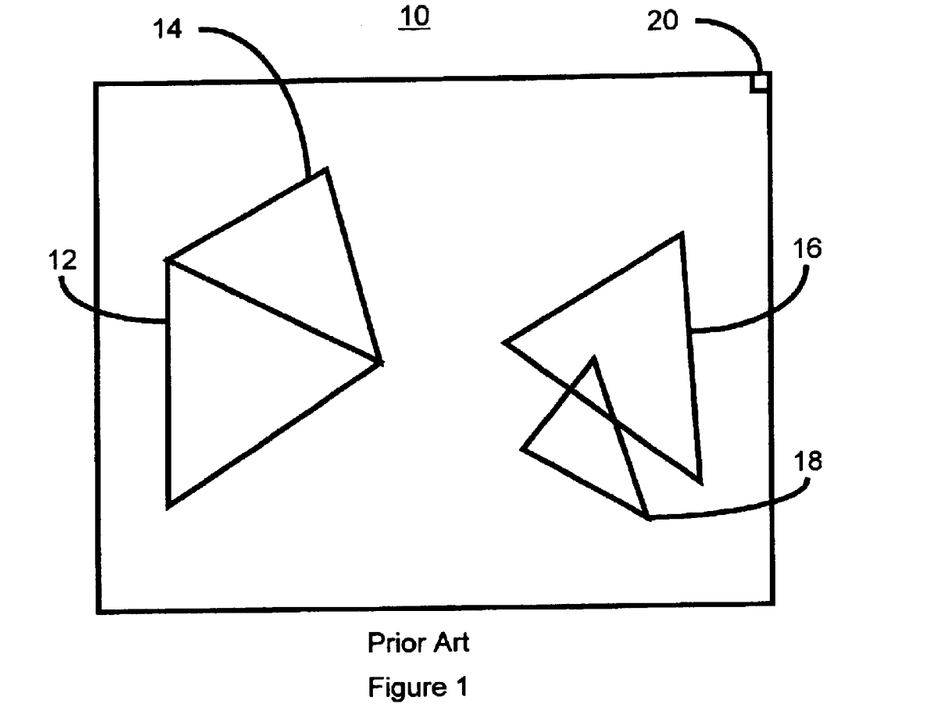
FIG. 1 is a diagram of a conventional display.

Conventional computer systems are widely used to display three-dimensional graphical images. For example, FIG. 1 depicts a display 10 for a conventional computer system. The display 10 is typically a LCD. The display 10 include a plurality of pixels, one of which is depicted as pixel 20. The display 10 is used for providing graphical images to users. Typically, objects in the graphical image are broken into primitives, typically triangles. Four primitives 12, 14, 16 and 18 are depicted in FIG. 1. Primitives may stand alone, may be adjacent, such as the primitives 12 and 14, or may intersect, such as the primitives 16 and 18.

Each of the primitives 12, 14, 16 and 18 intersects one or more pixels 20. The data for a primitive intersecting a particular pixel will be termed a fragment. Thus, each fragment corresponds to a particular pixel and a particular primitive, or object. The fragment typically includes, but is not limited to, color data, α-blending data, texture data, the z-value (distance from the viewing plane) and x and y coordinate values (position across the display screen). The texture data for a fragment typically includes one or more textures which are to be displayed. In order to display the graphical image, data for each fragment intersecting each pixel 20 is processed, then displayed on the pixels 20. The texture can be thought of as another color that is typically derived from a texture map. In most conventional systems, texture from the texture map and primitive's color are blended together to obtain a final color value for the fragment. Thus, at least both the color and the texture data for each fragment are processed in order to display the graphical image.

Multum in parvo (MIP) maps often are used for texture processing. Using MIP maps for texture mapping, an object's (or primitive's) size and distance from the viewing plane can be accounted for. Each MIP map contains data for a texture on several levels. Each level of the MIP map contains data for the texture at a different resolution. For example, the first MIP map level may contain the texture at a first, fill resolution. The second MIP map level contains a lower resolution version of the texture. Higher MIP map levels contain lower resolution versions of the texture. The second MIP map level is thus at one-half of the resolution of the first MIP map level. The third MIP map level typically contains a version of the texture at one-fourth the resolution of the first MIP map level.

In order to use the MIP map, the appropriate MIP map level for each fragment is selected. The texture for this MIP map level can then be used in texture mapping for the fragment being rendered. In some conventional methods, the MIP map level is selected using a ratio which depends upon a conventional display area and a conventional texture area. The display area is the area occupied on the display 10 (display space) by a primitive 12, 14, 16, or 18 or a portion of the primitive 12, 14, 16, or 18, such as a pixel 20. The conventional texture area is the corresponding area in the texture (texture space). The conventional display area divided by the conventional texture area provides a ratio which is used to select a MIP map level and, in some conventional systems, interpolate between MIP map levels.

Once the final color value, using the color data and texture data of a fragment, is obtained, the fragment can be displayed on a pixel 20. To be capable of displaying different colors, each pixel 20 typically has multiple display elements of different colors. Typically, there are three display elements per pixel 20. These display elements typically are red, green and blue. Just as each pixel 20 has a size and location on the display 10, the display elements within a pixel have a physical size and location within the pixel 20.

Figure 2A:
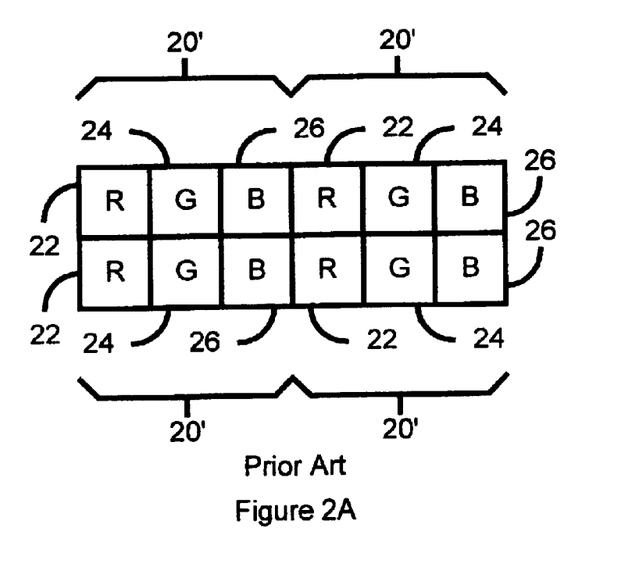
FIG. 2A is a diagram of pixels in a portion of a conventional display which have a first configuration of display elements.
Figure 2B:
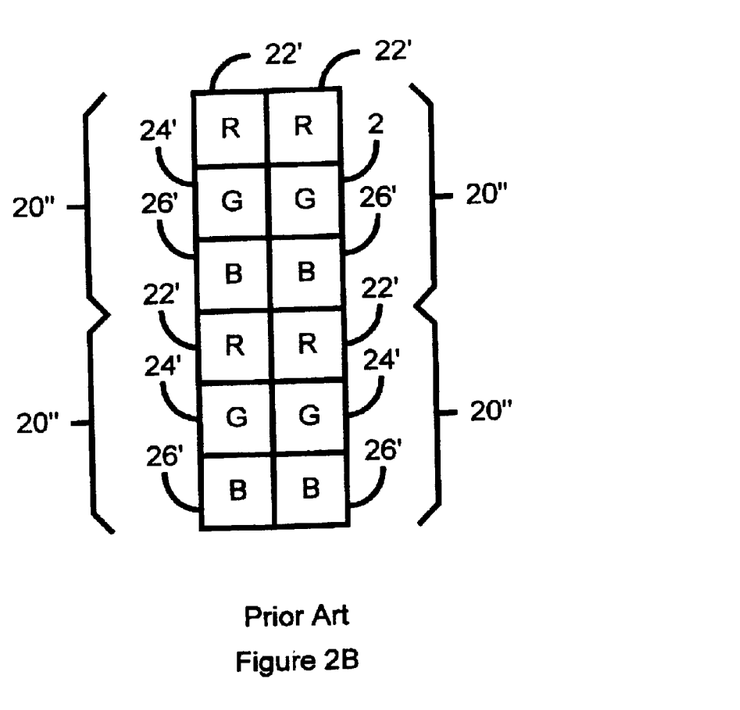
FIG. 2B is a diagram of pixels in a portion of a conventional display which have a second configuration of display elements.
Figure 2C:
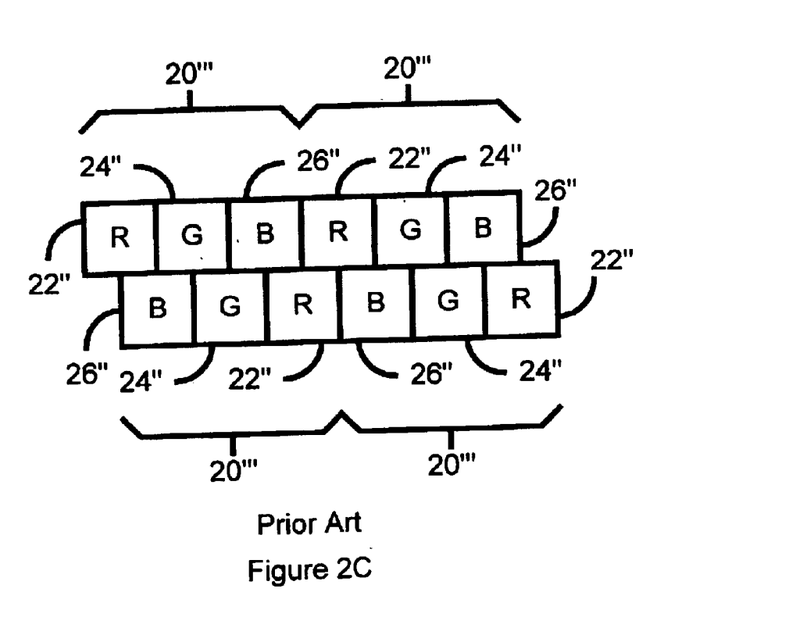
FIG. 2C is a diagram of pixels in a portion of a conventional display which have a third configuration of display elements.

The display elements may also be configured differently. For example, FIGS. 2A, 2B and 2C depict different configurations for display elements. FIG. 2A depicts a two pixel by two pixel portion of the display 10 having four pixels 20'. Each of the pixels 20' includes display elements 22, 24 and 26. The display element 22 is red. The display element 24 is green, and the display 26 is blue. The pixels 20' are thus arranged in an array such that the display elements 22, 24 and 26 always alternate colors red, green, then blue in each row. FIG. 2B depicts a two pixel by two pixel portion of the display 10 having four pixels 20''. Each of the pixels 20'' also includes display elements 22, 24 and 26. The pixels 20'' are thus arranged in an array such that the display elements 22, 24 and 26 always alternate colors red, green, then blue in each column. FIG. 2C depicts a two pixel by two pixel portion of the display 10 having four pixels 20'''. Each of the pixels 20''' includes display elements 22, 24 and 26. The pixels 20''' are thus arranged in an array such that the display elements 22, 24 and 26 alternate colors red, green, then blue in one row. In the next row of pixels 20''', the display element 26 is first, followed by the display elements 24 and 22, respectively. In addition, the display elements 22, 24 and 26 in one row are offset from the display elements 26, 24 and 22 in the next row. Although the configurations of display elements 22, 24 and 26 has been explained using pixels 20', 20'' and 20''', for simplicity when reference is made to a pixel 20, the pixel 20 could be any one of the pixels 20', 20'', 20''' or a pixel having a different configuration of display elements or display elements of different colors.

Figure 3:
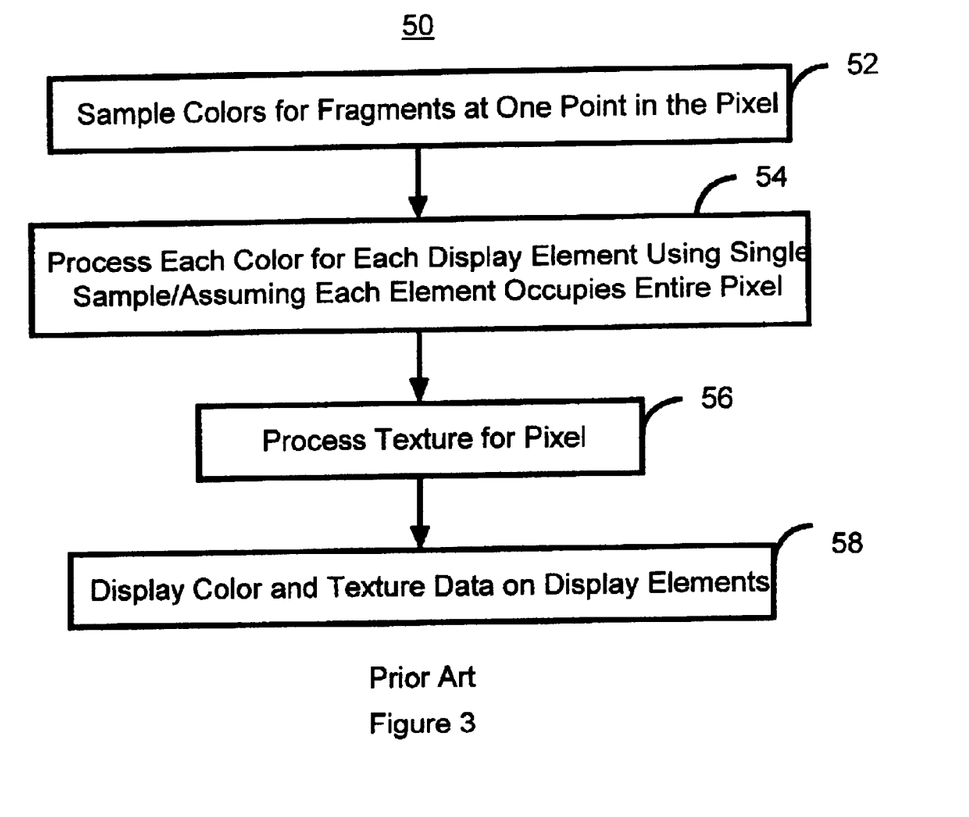
FIG. 3 is a flow-chart of a conventional method for rendering color and texture data for a fragment.

FIG. 3 depicts one embodiment of a conventional method 50 for processing color and texture data for a particular pixel 20. The color or colors for each fragment intersecting the pixel 20 is sampled at a particular point in the pixel 20, via step 52. Typically, the color for each fragment is sampled at the center of the pixel 20. This sampling at a particular point typically results in a red value, a green value and a blue value for each fragment intersecting the pixel. Thus, a color value for each display element 22, 24 or 26 is typically obtained through a single sampling of the fragment at a single point in the corresponding pixel. The color values for each fragment are processed for the pixel, via step 54. Step 54 often includes interpolating the color values to provide new, interpolated color values.

Texture data for each fragment is also processed, via step 56. As discussed above, typically the texture data for each fragment can be considered to be an additional color to be displayed. In order to perform step 56, the texture or textures are obtained from a single sample point, typically at the same point from which color is sampled. Step 56 also typically includes providing texture data of the appropriate resolution using MIP map levels to account for an object's distance from the viewing plane. The color and texture data are then displayed, via step 58. Typically, step 58 includes combining the texture and color data. For example, step 58 typically includes combining the interpolated red, green and blue values with the corresponding texture values. Step 58 would also include displaying these combined values in the red display element 22, the green display element 24 and the blue display element 26, respectively. The method 50 can be repeated for each of the pixels 20 in the display 10. Consequently, a graphical image can be provided.

Although the conventional method 50 functions, one of ordinary skill in the art will readily realize that each of the pixels 20 and thus each of the display elements 22, 24 and 26 has a physical size and location. In other words, each of the display elements 22, 24 and 26 has physical dimensions and is generally offset from the center of the pixel 20. Thus, even if red, green and blue are displayed using the display elements 22, 24, and 26, the pixel 20 is not a uniform color. For example, for the pixel 20', the left edge of the pixel 20' will appear more red, while the right edge of the pixel 20' will appear more blue because of the size an location of the display elements 22 and 26, respectively. This effect is known as color bleeding.

For example, assume the display 10 is to appear completely white and that the display 10 includes pixels 20' having display elements 22, 24 and 26 in the configuration shown in FIG. 2A. Also assume that the conventional method 50 is utilized to display the white screen. Thus, the red, green and blue color values are obtained as if each of the display elements 22, 24 and 26 were in the center of the pixel 20' and filled the pixel 20'. However, when actually displayed, the display elements 22, 24 and 26 are offset. As a result, the left edge of the display 10 will appear reddish, while the right edge of the display 10 will appear bluish. Although this effect might be mitigated by using another configuration of display elements 22, 24 and 26, color bleeding will still occur. For example, if the configuration of display elements 22, 24 and 26 depicted in FIG. 2B is used in conjunction with the method 50, the top and bottom edges of the display 10 may be red and green, respectively. Similarly, if the configuration of display elements 22, 24 and 26 depicted in FIG. 2C is used in conjunction with the method 50, the left and right edges of the display 10 may be purple.

The color bleeding effect is even more noticeable for devices that use smaller displays 10. For example, many portable devices such as portable gaming devices, employ smaller displays 10. Consequently, each pixel 20 occupies a larger fraction of the display 10. The color bleeding described above becomes more noticeable to users for smaller devices having smaller displays 10.

Accordingly, what is needed is a system and method for reducing color bleeding, thereby improving color quality on a display. The present invention addresses such a need.

SUMMARY OF THE INVENTION

The present invention provides a method and system for providing a graphical image on a display. The image is provided from data describing at least one object. The display includes a plurality of pixels. Each of the plurality of pixels has a size and a plurality of display elements. Each of the plurality of display elements has a color. The data includes a plurality of fragments for the at least one object. The plurality of fragments intersects a portion of the plurality of pixels. Each of the plurality of fragments includes a texture and at least one color. The method and system comprise ensuring that a texture area corresponds to the size of the pixel for the plurality of fragments and taking a plurality of samples of the at least one color for each of the plurality of fragments. The plurality of samples corresponds to the plurality of display elements. The method and system also comprise processing the texture for each of the plurality of fragments using the texture area. The method and system also comprise processing the at least one color for a each of the portion of the plurality of pixels utilizing one sample of the plurality of samples for each of the plurality of display elements for each of the portion of the plurality of pixels.

According to the system and method disclosed herein, the present invention provides improved color quality without sacrificing other aspects of image quality, such as texture quality. In addition, the method and system disclosed herein efficiently use hardware of a computer system.

DETAILED DESCRIPTION OF THE INVENTION

The present invention relates to an improvement in display of graphical image on a display. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Graphical images are typically depicted on a display. A display includes a plurality of pixels. Each pixel in the display may include a plurality of display elements. For example, a single pixel may include a red display element, a green display element and a blue display element. Through combinations of the display elements, the display is able to depict various colors.

Graphical images include objects that are generally broken into primitives. In addition, the primitives, or objects, can be broken into fragment. Each fragment intersects a particular pixel of the display. The fragment includes image data for the portion of the object that intersects the corresponding pixel. For example, the fragment typically includes color and texture data, z values, x and y coordinate values, and other image data.

In order to render a graphical image, a conventional computer system samples the color data for a fragment at a particular point in the pixel. From this single sample, the color data for each of the display elements, for example for red, green and blue display elements, is obtained and processed. In addition, texture processing for the fragment is also performed. The color and texture data are then combined and displayed. This process is carried out for each fragment and each pixel.

Although conventional systems are capable of displaying color images as described above, one of ordinary skill in the art will readily recognize that color bleeding will result. The display elements of each pixel have physical dimensions and are offset from each other. Conventional methods of rendering a graphical image treat the display elements as though they each occupy the entire pixel. Consequently, the color at the edges of objects or at edges of the display may have the incorrect color. For example, some pixels include a red display element, a green display element and blue display element in a row. The display is made up of an array of these pixels. When a blank white screen is to be shown, the left edge of the screen will be tinged red, while the right edge of the screen will appear slightly blue. This color bleeding is exacerbated in portable devices, such as portable gaming devices, which have a smaller display. The color bleeding appears to a greater extent in such portable devices because each pixel, and thus each display element, occupies a greater portion of the display.

One method which could be used to address this color bleeding is supersampling both color and texture data. This type of supersampling takes multiple samples of a fragment for each pixel. For example, if there are three display elements per pixel, supersampling might take three samples of a fragment per pixel with each sample being centered at one of the display elements. These samples are then used for processing the image data for each fragment. In other words, these samples will be used in processing both color and texture data for each fragment. The color values for each sample may also be used for a corresponding display element. For example, if the display elements are red, green and blue, then the red color value obtained using the first sample will be used for the red display element, the green color value obtained using the second sample will be used for the green display element, and the blue color value obtained using the third sample may be used for the blue display element. Consequently, the color bleeding can be reduced.

Although the supersampling described above improves color quality by reducing color bleeding, one of ordinary skill in the art will readily realize that supersampling adversely affects the texture quality for the image being rendered. In particular, when supersampling is performed, the area used in texture mapping is the sample area. Because supersampling samples a fragment multiple times per pixel, the area for texture mapping is a fraction of area of a pixel. For example, the fragment may be sampled three times because there are three display elements per pixel. The area for texture processing would then be one-third of the area of the pixel. This area would then be used for determining the MIP map level, as discussed above. The textures for each sample might then be averaged and applied to the entire pixel. However, the MIP map level would be the incorrect MIP map level because of the difference between the area used for texture processing is different from the pixel area. In addition, textures often have a high frequency component. Thus, the average of the textures obtained for the three samples could also be very different from the texture that would be obtained if a single sample were used. Consequently, the texture obtained from texture processing is different from what is desired. As a result, the texture quality worsens. Supersampling, therefore, improves color quality at the expense of texture quality, which is undesirable.

Another method that could be used to improve texture quality is to treat fragments for a graphical image as if there were multiple images, one for each color of display elements in a pixel. For example, suppose each pixel has a red display element, a green display element and a blue display element. There would be considered to be three different images, one for the red display elements, one for the green display elements and one for the blue display elements. The images would also be offset. The red image would be sampled at the center of each red display element. The blue and green images would be sampled at the center of each green and blue display element, respectively. Thus, each of the images would be sampled once per pixel. However, the sampling point for each of the images would be shifted from the center of the pixel to the center of the corresponding display element. The colors for each of the images are separately processed and displayed on the display element. Color quality is thus improved. In addition, the area for texture processing for each of the images would be the same as the area of the pixel. This is because each display element of a particular color is separated from a next display element of the particular color by the size of a pixel. Thus, texture quality may not suffer.

Although processing fragments as though there are multiple images improves color quality, this process is relatively difficult to implement. In particular, a different interpolation value must be calculated for interpolating data for each of the images corresponding to each of the colors of display elements. These interpolation values require a significant amount of calculations. In addition, calculating separate interpolation values requires a significant amount of additional hardware. Including this additional hardware is undesirable because it increases the size of computer system. Consequently, rendering the graphical image by using multiple images, one for each color display element, is also undesirable.

The present invention provides a method and system for providing a graphical image on a display. The image is provided from data describing at least one object. The display includes a plurality of pixels. Each of the plurality of pixels has a size and a plurality of display elements. Each of the plurality of display elements has a color. The data includes a plurality of fragments for the at least one object. The plurality of fragments intersects a portion of the plurality of pixels. Each of the plurality of fragments includes a texture and at least one color. The method and system comprise ensuring that a texture area corresponds to the size of the pixel for the plurality of fragments and taking a plurality of samples of the at least one color for each of the plurality of fragments. The plurality of samples corresponds to the plurality of display elements. The method and system also comprise processing the texture for each of the plurality of fragments using the texture area. The method and system also comprise processing the at least one color for a each of the portion of the plurality of pixels utilizing one sample of the plurality of samples for each of the plurality of display elements for each of the portion of the plurality of pixels.

The present invention will be described in terms of a particular system and a particular type of display. However, one of ordinary skill in the art will readily recognize that this method and system will operate effectively for other computer-graphics system having different or other components. Furthermore, for clarity steps or components may be omitted from the discussion of the method and system in accordance with the present invention. In addition, one of ordinary skill in the art will also readily recognize that the present invention can be used with other displays. The present invention will also be described in the context of a computer system which renders fragments in raster order, i.e. pixel by pixel in order. However, one of ordinary skill in the art will readily realize that nothing prevents the present invention from rendering fragments in another order. For example, nothing prevents the present invention from being used in a system which renders a graphical image primitive by primitive or object by object.

Figure 4:
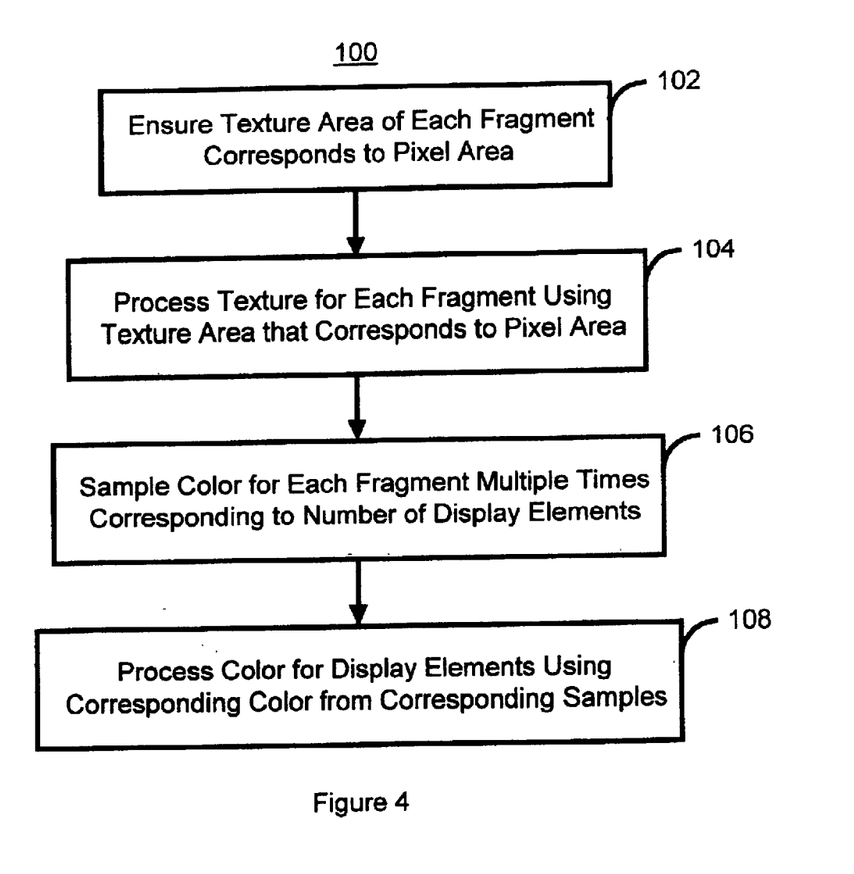
FIG. 4 is a high level flow-chart of a method for rendering color and texture data in accordance with the present invention.

To more particularly illustrate the method and system in accordance with the present invention, refer now to FIG. 4, depicting one embodiment of a method 100 for rendering a graphical image in accordance with the present invention. The method 100 is used in conjunction with a display, such as the display 10 depicted in FIG. 1. In addition, the method 100 is used for the display 10 having pixels 20 that each include a number of display elements, such as the display elements 22, 24 and 26 depicted in FIGS. 2A–2C. Referring back to FIG. 4, in a preferred embodiment, the method 100 is used in rendering fragments for an image in raster order. However, nothing prevents the method 100 from being used in rendering an image in another order, for example primitive by primitive. In addition, as discussed above, each fragment preferably intersects a particular pixel and preferably contains image data, such as color and texture, for a particular primitive, or object. The method 100 is also preferably used for rendering and improving the color quality of three-dimensional graphical images.

For each fragment, the texture area is ensured to correspond to the area of a corresponding pixel, via step 102. The texture area is the area that will be used in texture processing, for example for determining MIP map levels. Preferably, the texture area for a particular fragment is set equal to the area of the corresponding pixel. This can be accomplished in many ways, including ensuring that the area of the primitive of which the fragment is a part is not altered by operations performed for color sampling, as discussed below.

A plurality of samples is taken for each fragment, via step 104. The samples taken in step 104 sample at least the color(s) of the fragment. Thus, supersampling is performed in step 104. At each sample, color data is obtained for each of the display elements of the corresponding pixel 20. The number of samples taken also corresponds to the number of display elements 22, 24 and 26 in a pixel 20. Preferably, the number of samples taken of the fragment is equal to the number of display elements 22, 24 and 26. Thus, for a pixel 20 having a red display element 22, a green display element 24 and a blue display element 26, three samples are taken. Preferably red color data, green color data and blue color data are obtained for each of the three samples. However, nothing prevents obtaining color data for fewer colors at each sample. For example, one sample could obtain red color data, another could obtain green color data, and a third could obtain blue color data. The samples taken are preferably spaced apart within the fragment, or pixel 20. In a preferred embodiment, the position for each sample is centered on a different one of the display elements 22, 24 and 26. For example, for a pixel 20 having a row of display elements 22, 24 and 26 in order, the first sample would be taken at the center of the display element 22, the second sample would be taken at the center of the display element 24 and the third sample would be taken at the display element 26. In one embodiment, data other than color, such as α-blending values, could also be sampled at the same points that color is sampled for the fragment.

The texture(s) for each fragment are processed using the texture area, via step 106. Step 106 may include selecting the appropriate texture and the appropriate MIP map level for the fragment. Consequently, the texture(s) for each fragment will be processed as desired.

Color is processed for each of the fragments intersecting each of the pixels using one of the samples for each of the display elements, via step 108. In a preferred embodiment, color data for each of the display elements is processed for each of the samples, then some of the color data is discarded. For example, red, green and blue color data could be processed from each of the three samples discussed above. The processed green and blue color data could then be discarded from the first sample's data. Similarly, the processed red and blue color data could then be discarded from the second sample's data. The processed green and red color data could also be discarded from the third sample's data. However, in an alternate embodiment, step 108 could include processing only the color data for the corresponding display element. For example, only red color data could be processed for the red display element 22, only green color data could be processed for the green display element 24 and only blue color data could be processed for the blue display element 26. The processed color and texture data could be displayed on the display 10.

As a result, processed color data that corresponds to each display element 22, 24 and 26 would be obtained for each pixel 20. This color data could be used for displaying each fragment on each corresponding display element 22, 24 and 26. Furthermore, because of supersampling, the color data can be obtained using samples taken at the appropriate location for each display element 22, 24 and 26. For example, color data for the corresponding display element 22, 24 or 26 could be taken from a sample at the center of the corresponding display element 22, 24 or 26, respectively. Thus, color bleeding is reduced and color quality improved. Moreover, texture quality may not suffer. The texture data for a fragment is processed using the texture area, which corresponds to the area of the entire pixel. Thus, the appropriate texture data and appropriate MIP map level will be obtained. Consequently, color quality is improved without sacrificing texture quality.

Figure 5:
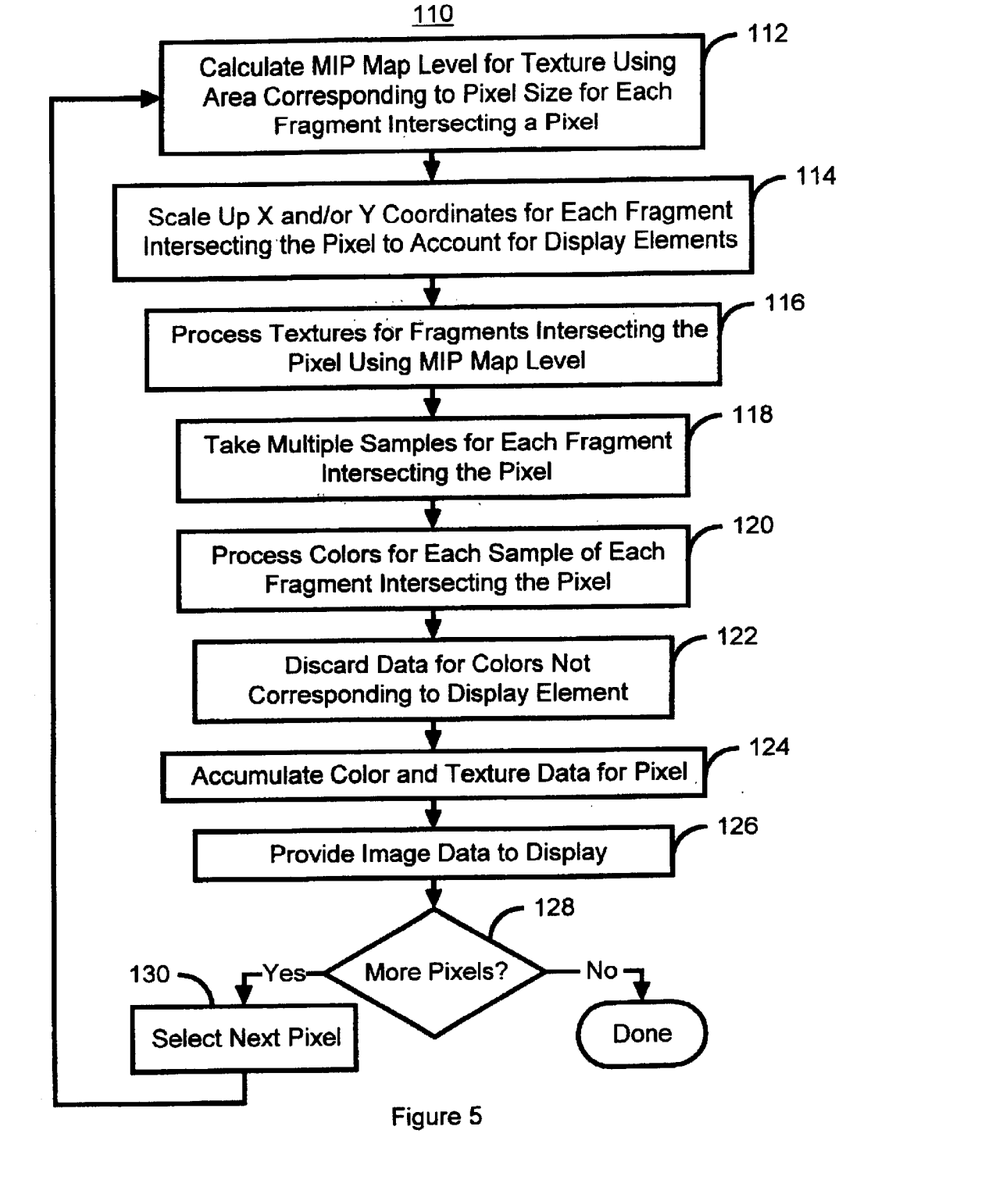
FIG. 5 is a more detailed flow-chart of a method for rendering color and texture data in accordance with the present invention.

FIG. 5 depicts a more detailed flow chart of a preferred embodiment of a method 110 for improving color quality, preferably in three-dimensional graphical images, in accordance with the present invention. The method 110 will also be described using the display 10, the pixel 20 and the display elements 22, 24 and 26. The method 110 is preferably implemented so that the graphical image is rendered in raster order. Thus, the method 110 preferably renders all of the fragments intersecting a particular pixel 20 before rendering the fragments intersecting a next pixel 20. However, nothing prevents the method 110 from rendering the graphical image in another order.

The MIP map level(s) for each fragment intersecting a particular pixel are calculated based on a texture area which corresponds to the pixel area, via step 112. Thus, step 112 ensures that the texture area used in texture processing corresponds to the pixel area, rather than to a smaller area appropriate for supersampling. In a preferred embodiment, step 112 is performed by calculating a ratio of the area of the primitive of which each fragment is a part using the x, y and z coordinates of the primitive without any adjustments that may be made for supersampling. Step 112 also includes calculating the ratio of the area of the primitive to that of the texture being used.

The x-coordinates and/or y-coordinates for each fragment intersecting the particular pixel are scaled up by a factor appropriate for each, via step 114. The coordinates are scaled up to allow supersampling, discussed below. In a preferred embodiment, step 114 occurs after step 112. Consequently, step 112 can be performed using the coordinates stored for the fragment, followed by preparation of the image data for supersampling in step 114. The factor by which the x and/or y-coordinates are scaled up depends upon the configuration of the display elements 22, 24 and 26 in the pixel 20. For example, if the pixel 20 has the configuration shown in FIG. 2A (for the pixel 20'), then the x-coordinate only will be scaled up by a factor of three. If the pixel 20 has the configuration shown in FIG. 2B (for the pixel 20"), then the y-coordinate only will be scaled up by a factor of three. If the pixel 20 has some other configuration, then the x and y-coordinates may be scaled up by the appropriate factors. Referring back to FIG. 5, step 112 is also preferably performed by scaling up the appropriate coordinates of the primitive of which each fragment intersecting the particular pixel is a part.

The texture(s) for each fragment intersecting the pixel being rendered are processed using the appropriate MIP map levels and other texture data, via step 116. Consequently, the textures for the fragments will not be affected by the supersampling. Each fragment intersecting the pixel is also sampled multiple times using the x and y-coordinates, via step 118. These samples correspond to the different display elements in the pixel 20. Thus, each fragment is preferably sampled once per display element in step 118. Because the x and/or y-coordinates have been scaled up, step 118 is preferably accomplished by sampling the fragments at intervals which would correspond to a pixel prior to scaling up the coordinates. Thus, if only the x-coordinates have been scaled up by a factor of three, each fragment intersecting the pixel will be sampled three times, preferably at equal intervals, in the x direction. The y-coordinate for each of the three samples will be the same because the y-coordinate was not scaled up. As a result, each fragment intersecting a pixel 20 will be sampled at the center of each of the display elements 20, 22, or 24 for the pixel 20 that each fragment intersects. The data sampled at the center of a particular display element 20, 22 or 24 will be used for processing the color that will be displayed using the particular display element. In a preferred embodiment, step 118 also samples all of the color data for the fragment at each sample, irrespective of the display element to which the sample corresponds. For example, for a red display element 22, red, green and blue color values are preferably obtained. However, in an alternate embodiment, color data only for the display element to which the sample corresponds could be obtained.

The colors for the samples for each of the fragments intersecting the pixel are processed, via step 120. Step 120 preferably includes processing all of the color data for each sample of each fragment intersecting the pixel. For example, if the pixel includes red, green and blue display elements 22, 24 and 26, respectively, then step 120 processes the red green and blue color data for each sample. Processing all of the color data for each sample does not consume a great deal of additional time because the more complex calculations, for example some of those used in interpolation, are the same for each of the colors. Consequently, these calculations can be performed only once per sample. Specific calculations for the individual colors for the sample can then be rapidly carried out. However, in an alternate embodiment, only the color for the display element to which the sample corresponds may be processed.

The color data in each sample that is not needed for the corresponding display element is discarded, via step 122. In a preferred embodiment, step 122 occurs after step 120. Thus, processed color data is preferably discarded in step 122. For example, for a sample of a fragment to be used in for a red display element 22, processed blue and green color data is discarded in step 122. Similarly, for a sample of a fragment to be used in for a green display element 24, processed blue and red color data is discarded in step 122. Thus, after step 122 is performed, only the color data for the display element to which the sample corresponds remains. In an alternate embodiment, step 122 could occur before step 120. In such an embodiment, color data that will not be used for a particular display element would be discarded prior to processing.

The color data and texture data for each fragment intersecting the pixel is accumulated, via step 124. Step 124 preferably includes accumulating texture data as well as the color data for all samples of all fragments corresponding to each display element. The accumulated color and texture data, as well as other image data, is provided to the display 10, via step 126. In one embodiment, the display 10 can also include a display memory, such as a frame buffer (not shown). Thus, step 126 could include providing the image data for the pixel to the display memory. It is then determined whether there are additional pixels 20 to render, via step 128. If not, then the scan is finished and the method terminates. If, however, there are additional pixels 20 to render, then a next pixel 20, preferably in raster order, is selected, via step 130. Step 112 is then returned to in order to render the next pixel 20. Thus, the method 110 repeats to allow all of the fragments intersecting the pixels 20 of the display to be rendered.

Using the method 110, color quality can be improved without sacrificing texture quality. Thus, the method 110 has substantially the same benefits as the method 100. In particular, color bleeding due to the physical size and separation of the display elements 22, 24 and 26 within a pixel 20 are accounted for. In addition, texture quality may not suffer. The texture data for a fragment is processed using the texture area, which corresponds to the area of the entire pixel. Thus, the appropriate texture data and appropriate MIP map level will be obtained. Consequently, color quality is improved without sacrificing texture quality.

Figure 6:
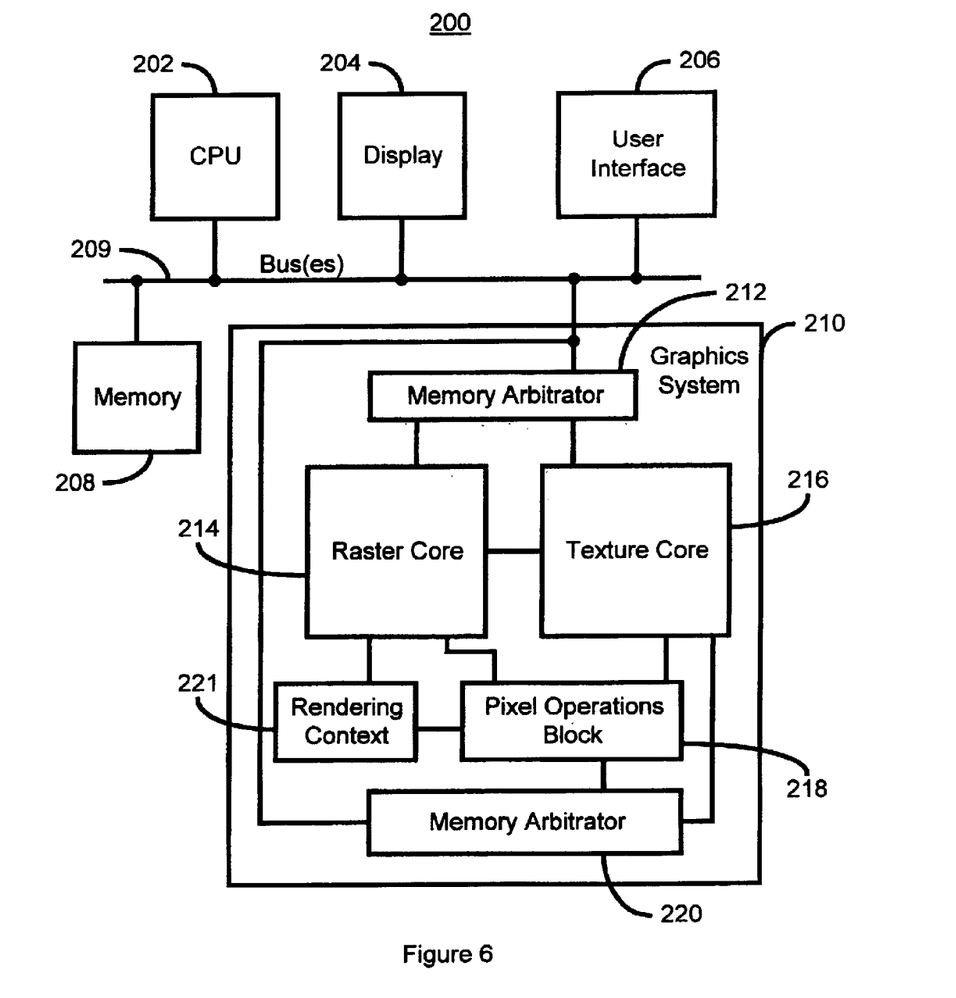
FIG. 6 is a high-level block diagram of a computer system capable of rendering color and texture data in accordance with the present invention.

FIG. 6 depicts a high-level block diagram of a computer system 200 including a graphics system 210 for improving color quality, preferably of three-dimensional graphical images, in accordance with the present invention. The computer system 200 includes a central processing unit (CPU) 202, a display 204, a user interface 206, a memory 208, buses 209 and the graphics system in accordance with the present invention 210. The display 204 is preferably essentially the same as the display 10 depicted in FIG. 1. Thus, the display 204 preferably includes pixels 20 having display elements 22, 24 and 26. However, display elements 22, 24 and 26 may have colors other than red, green and blue, respectively, and a variety of configurations.

Referring back to FIG. 6, the graphics system 210 includes memory arbitrators 212 and 220, a raster core 214, a texture core 216, a pixel operations block 218 and a rendering context 221. The graphics system 210 preferably performs the methods 100 and 110 depicted in FIGS. 4 and 5. Referring back to FIG. 6, the raster core 214 preferably ensures that the texture area corresponds to the pixel area and samples each fragment multiple times for each pixel. The raster core 214 also preferably calculates the MIP map level to be used in texture processing. The texture core preferably performs most or all of the texture processing. The pixel operations block 218 accumulates the color and texture data and preferably discards color data that is not to be used in displaying the fragments intersecting the pixels 20.

Figure 7:
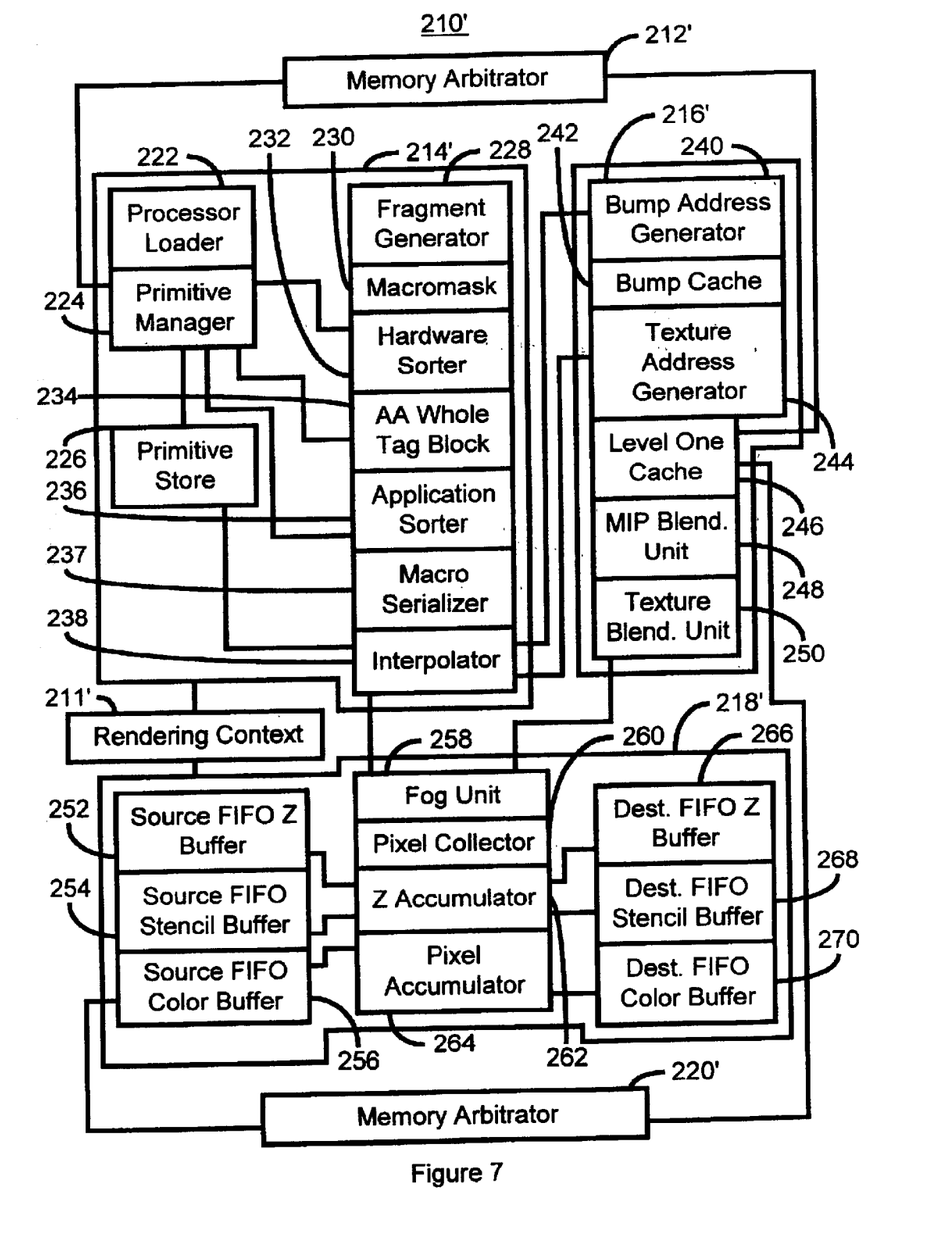
FIG. 7 is a more detailed block diagram of a preferred embodiment of a computer system capable of rendering color and texture data in accordance with the present invention.

FIG. 7 depicts a more-detailed block diagram of a preferred embodiment of the graphics system 210'. The graphics system 210' preferably renders the image in raster order. For clarity, only certain portions of the graphics system 210' will be discussed in detail. The raster core 214' includes a processor loader 222, a primitive manager 224, a primitive store 226, a fragment generator 228, a macromask block 230, a hardware sorter 232, an antialiasing whole tag block 234, an application sorter 236, a macroserializer 237, and an interpolator 238. The texture core 216' includes a bump address generator 240, a bump cache 242, a texture address generator 244, a level one cache 246, a MIP blending unit 248 and a texture blending unit 250. The pixel operations block 218' includes a source first in first out (FIFO) buffer 252, a source FIFO stencil buffer 254, a source FIFO color buffer 256, a fog unit 258, a pixel collector 260, a z accumulator 262, a pixel accumulator 264, a destination FIFO z buffer 266, a destination FIFO stencil buffer, a destination FIFO color buffer and a sample discard unit 272.

The processor loader 222, the primitive manager 224 and the primitive store 226 operate on primitives, such as the primitives 12, 14, 16 and 18 depicted in FIG. 1. Referring back to FIG. 7, the primitive manager 224 performs several operations on the primitives to be rendered. The primitive manager 224 prepares the primitives to allow the fragments of the primitives to be rendered pixel 20 by pixel 20 in raster order. In particular, the primitive manager 224 calculates the MIP map levels for the primitives. In a preferred embodiment, the primitive manager 224 performs this function by calculating the area of the primitive and dividing the area of the primitive by the area of the texture. This ratio would then be used for providing the MIP map level. In addition, the primitive manager 224 also scales up the coordinates of the primitives. Thus, the primitive manager 224 preferably performs step 114 of the method 110 depicted in FIG. 5. Referring back to FIG. 7, the primitive manager 224 scales up the x and/or y-coordinates to allow for supersampling of each fragment of each primitive. The primitive manager 224 scales up the coordinates of the primitives after calculating the MIP map levels for the primitives. Consequently, texture processing will not be affected the supersampling.

The fragment generator 228, macromask block 230, hardware sorter 232, antialiasing whole tag block 234, application sorter 236 and interpolator 238 perform operations on fragments for the primitives that intersect a particular pixel 20. In particular, the fragment generator 228 generates fragments intersecting a particular pixel 20 from the data for the primitives provided from the primitive manager 224. The fragment generator 228 thus ensure that multiple samples of the fragments intersecting the pixel are taken in order to provide the samples to be used in processing the color corresponding to each of the display elements 22, 24 and 26. The macromask block 230, hardware sorter 232, antialiasing whole tag block 234, application sorter 236 and interpolator 238 also perform various functions in image processing. For example, the hardware sorter 232 sorts the fragments by their z-coordinate values. The interpolator 238 performs interpolations for each of the samples. In a preferred embodiment, only one interpolator 238 is used. In an alternate embodiment, multiple interpolators could be used, for example one for each color of a display element 22, 24 or 26. However, in such an embodiment, the size of the graphics system 210' would be larger. Thus, the graphics system 210' performs supersampling.

The bump address generator 240, the bump cache 242, the texture address generator 244, the level one cache 246, the MIP blending unit 248 and texture blending unit 250 perform texture processing for each of the fragments using data provided from the raster core. The color and texture data provided form the interpolator 238 of the rater core 214' and the texture blending unit 250 of the texture core 216' are provided to the pixel operations block 218'. The color and texture data for each sample of each fragment intersecting the pixel are accumulated in the pixel accumulator 264. The data is then provided to the sample discard unit 272. The sample discard unit 272 discards processed color data that is not the same color as the display element 22, 24 or 26 to which to the sample corresponds. For example, if the first sample of each fragment corresponds to the red display element 22, then the sample discard unit 272 discards green and blue color data for the first sample of each fragment intersecting the pixel 20. The remaining data is then accumulated in -the destination FIFO color buffer 276. The image data for the fragments intersecting the pixel can then be output from the graphics system 210' to the display 202. In a one embodiment, the image data is provided to the display memory of the display 202. The data corresponding to the first sample for each pixel 20 is provided for display on the first display element for the pixel 20. The data corresponding to the second sample for each pixel 20 is provided for display on the second display element for the pixel 20. The same is true for subsequent samples and the corresponding display elements.

Note that the configuration of display elements 22, 24 and 26 in the pixel 20 may change in some embodiments. For example, if the display elements 22, 24 and 26 are arranged as shown in FIG. 2C, the display elements 22, 24 and 26 will be arranged in order in one row, but be arranged in the opposite order (display elements 26, 24 and 22) in the next row. In such a case, the data discarded by the sample discard unit 272 for each sample changes depending upon the row in which the pixels 20 being processed reside. The sample discard unit 272 discards the green and blue color data for the first sample, the red and blue color data for the second sample, and the red and green color data for each fragment intersecting each pixel in one row. The sample discard unit 272 also discards the red and green color data for the first sample, the red and blue color data for the second sample, and the green and blue color data for each fragment intersecting each pixel in the next row. Consequently, the sample unit 272 discards the appropriate data to allow color to be displayed for the corresponding display element 22, 24 and 26.

Thus, the graphics processor 210 and 210' allow the color quality to be improved. Using the graphics processor 210 or 210', processed color data that corresponds to each display element 22, 24 and 26 is obtained for each pixel 20 and is used for displaying each fragment on each corresponding display element 22, 24 and 26. Furthermore, because of supersampling, preferably performed by the fragment generator 228, the color data can be obtained using samples taken at the appropriate location for each display element 22, 24 and 26. For example, color data for the corresponding display element 22, 24 or 26 could be taken from a sample at the center of the corresponding display element 22, 24 or 26, respectively. Thus, color bleeding is reduced and color quality improved. Moreover, texture quality may not suffer. The primitive manager 224 performs the calculations for determining the MIP map level prior to scaling up the coordinates. Thus, the texture data for each fragment is processed using the texture area, which corresponds to the area of the entire pixel. Thus, the appropriate texture data and appropriate MIP map level will be obtained. Using the graphics systems 210 or 210', therefore, color quality is improved without sacrificing texture quality.

A method and system has been disclosed for improving color quality of three-dimensional graphical images on a display. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing a graphical image of data describing at least one object, the data including a plurality of fragments for the at least one object, the system comprising:

a display including a plurality of pixels, each of the plurality of pixels having a plurality of display elements, each of the plurality of display elements having a color, each of the plurality of pixels having a size, the plurality of fragments intersecting a portion of the plurality of pixels, each of the plurality of fragments including a texture and at least one color;

a raster core for ensuring that a texture area corresponds to the size of the pixel for the plurality of fragments and for processing the at least one color for each of the plurality of fragments utilizing one sample of a plurality of samples for each of the plurality of display elements for each of the portions of the plurality of pixels;

a fragment generator coupled with the raster core, the fragment generator for taking the plurality of samples of the at least one color for each of the plurality of fragments, the plurality of samples corresponding to the plurality of display elements; and a texture core coupled to the raster core and the fragment generator for processing the texture for each of the plurality of fragments using the texture area.

2. The system of claim 1 wherein the rater core further provides a MIP map level based on the size of the pixel.

3. The system of claim 2 wherein the raster core further includes a primitive manager for ensuring that a texture area corresponds to the size of the pixel for each of the plurality of fragments.

4. The system of claim 3 wherein each of the plurality of pixels is described by a of x-coordinates and a plurality of y-coordinates, wherein:

the primitive manager further scales up the plurality of x-coordinates and/or the plurality of y-coordinates by a factor, the factor being based on a number of the plurality of samples; and wherein the fragment generator further takes a sample of the plurality of samples at each of a plurality of predetermined x-coordinates of the plurality of x-coordinates and a plurality of predetermined y-coordinates of the plurality of y-coordinates such that the plurality of samples are taken for each of the plurality of pixels.

5. The system of claim 4 wherein the at least one color includes a plurality of colors and wherein the sample includes a sample color for each of the plurality of colors.

6. The system of claim 5 wherein the raster core further includes an interpolator for interpolating the sample color for each of the plurality of colors for each of the plurality of fragments.

7. The system of claim 6 further comprising:

a pixel accumulator for accumulating the sample color for each of the plurality of colors for each sample, and a discard unit coupled to the pixel accumulator, the discard unit for discarding the sample color for each of the plurality of colors except a particular color of the plurality of colors for each sample, the particular color changing for each of the plurality of samples, the particular color corresponding to the color of a corresponding display element of the plurality of display elements; and a color destination first in first out (FIFO) buffer coupled to the discard unit, the color destination FIFO buffer for accumulating the particular color sample for the corresponding display element for each of the plurality of display elements for each pixel of the portion of the plurality of pixels.

8. The system of claim 4 wherein the primitive manager scales ensures that a texture area corresponds to the size of the pixel before the primitive manager scales up the plurality of x-coordinates and/or the plurality of y-coordinates.

* * * * *